(12) United States Patent
Kim (10) Patent No.: US 10,211,947 B2
(45) Date of Patent: Feb. 19, 2019

(54) SYSTEM-ON-CHIP USING DYNAMIC VOLTAGE FREQUENCY SCALING AND METHOD OF OPERATING THE SAME

(71) Applicant: Samsung Electronics Co., Ltd., Suwon-si, Gyeonggi-do (KR)

(72) Inventor: Ji-Won Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/797,495

(22) Filed: Oct. 30, 2017

(65) Prior Publication Data

US 2018/0183543 A1 Jun. 28, 2018

(30) Foreign Application Priority Data

Dec. 26, 2016 (KR) ........................ 10-2016-0179332

(51) Int. Cl.
| | |
|---|---|
| *H04L 1/00* | (2006.01) |
| *H04L 25/02* | (2006.01) |
| *G06N 99/00* | (2010.01) |
| *G06F 13/00* | (2006.01) |
| *G06F 1/26* | (2006.01) |

(52) U.S. Cl.
CPC .............. *H04L 1/0002* (2013.01); *G06F 1/26* (2013.01); *G06F 13/00* (2013.01); *G06N 99/005* (2013.01); *H04L 25/0262* (2013.01)

(58) Field of Classification Search
CPC .................................................... H04L 1/0002
USPC ......................................................... 375/225
See application file for complete search history.

(56) References Cited

U.S. PATENT DOCUMENTS

| | | | |
|---|---|---|---|
| 8,588,118 | B2 | 11/2013 | Sakamoto et al. |
| 8,972,759 | B2 | 3/2015 | Doshi et al. |
| 8,996,331 | B2 | 3/2015 | Anderson et al. |
| 9,152,214 | B2 | 10/2015 | Thumma |

(Continued)

FOREIGN PATENT DOCUMENTS

| | | |
|---|---|---|
| JP | 2000-349854 A | 12/2000 |
| JP | 3793123 B2 | 7/2006 |

(Continued)

*Primary Examiner* — Lihong Yu
(74) *Attorney, Agent, or Firm* — Harness, Dickey & Pierce, P.L.C.

(57) ABSTRACT

Inventive concepts relates to a system-on-chip using a dynamic voltage frequency scaling and a method of operating the same. The method of operating the system-on-chip may include learning a correlation between network throughput of a network input/output device receiving data packets and processing performance of a central processing unit processing the data packets, estimating a data transmission rate of the data packets based on a learning result of the correlation, dynamically changing setting information of a dynamic voltage frequency scaling algorithm based on the estimated data transmission rate, and controlling an operation frequency of the central processing unit according to the dynamic voltage frequency scaling algorithm. According to example embodiments of inventive concepts, the dynamic voltage frequency scaling algorithm may dynamically be applied considering the data transmission rate of the data packets being received.

11 Claims, 10 Drawing Sheets

(56) References Cited

U.S. PATENT DOCUMENTS

| | | | |
|---|---|---|---|
| 2013/0142049 A1* | 6/2013 | Jim | H04W 52/0225 370/241 |
| 2014/0086053 A1 | 3/2014 | Noro | |
| 2014/0301259 A1 | 10/2014 | Homchaudhuri et al. | |
| 2015/0161307 A1 | 6/2015 | Ueki | |
| 2015/0260787 A1 | 9/2015 | Chang | |
| 2016/0034013 A1 | 2/2016 | Kim et al. | |
| 2016/0041836 A1 | 2/2016 | Kruglick | |
| 2016/0055615 A1 | 2/2016 | Huang | |
| 2016/0062447 A1 | 3/2016 | Hsu et al. | |
| 2016/0077572 A1 | 3/2016 | Chang | |
| 2016/0111958 A1 | 4/2016 | Choi et al. | |
| 2016/0116956 A1 | 4/2016 | Kim et al. | |
| 2016/0154449 A1 | 6/2016 | Lim et al. | |
| 2016/0187897 A1 | 6/2016 | Peng et al. | |
| 2016/0187958 A1 | 6/2016 | Wang et al. | |
| 2016/0191200 A1* | 6/2016 | Wong | H04L 1/0026 370/329 |
| 2016/0314095 A1 | 10/2016 | Park et al. | |

FOREIGN PATENT DOCUMENTS

| | | |
|---|---|---|
| KR | 2014-0021283 A | 2/2014 |
| KR | 2014-0029721 A | 3/2014 |
| KR | 101543074 B1 | 8/2015 |
| KR | 101552953 B1 | 9/2015 |
| KR | 2016-0032529 A | 3/2016 |

\* cited by examiner

SYSTEM-ON-CHIP USING DYNAMIC VOLTAGE FREQUENCY SCALING AND METHOD OF OPERATING THE SAME

CROSS-REFERENCE TO RELATED APPLICATIONS

This U.S. non-provisional patent application claims priority under 35 U.S.C. § 119 of Korean Patent Application No. 10-2016-0179332, filed on Dec. 26, 2016, the entire contents of which are hereby incorporated by reference.

BACKGROUND

Inventive concepts relate to systems-on-chips, and more particularly, to a system-on-chip using a dynamic voltage frequency scaling, and a method of operating the same.

The use of mobile devices such as smart phones, tablet PCs, digital cameras, MP3 players, PDAs, etc. has grown in recent years. The employment of a high speed processor and mass storage medium has increased corresponding to an increase in the drive of a multimedia device and data throughput in the mobile device. The mobile device may drive various application programs. To drive various application programs, semiconductor devices including a working memory (e.g., DRAM), a nonvolatile memory, and an application processor (AP) are used in the mobile device. A demand for high performance in a mobile environment drives an increase in the degree of integration and driving frequency of the semiconductor devices.

Accordingly, performance of a processing unit or a memory in a mobile device has been developed. However, a demand for high performance in a mobile environment makes efficiently managing power challenging. A processing speed or performance of a mobile device is being standardized. Thus, the study of a battery technology or an effective power management technology for providing continuous service time to a user in a mobile environment is actively being performed.

As part of an effective power management, a dynamic voltage frequency scaling (DVFS) method is used. Since the dynamic voltage frequency scaling (DVFS) method is limited to an operation shape of each intellectual property (IP) block, the DVFS method does not consider a data transmission rate of a data packet that requires a specific process.

SUMMARY

Example embodiments of inventive concepts provide a method of operating a system-on-chip. The method of operating the system-on-chip may include learning a correlation between network throughput of a network input/output device, the network input/output device receiving data packets and processing performance of a central processing unit processing the data packets, estimating a data transmission rate of the data packets based on a result of learning the correlation, dynamically changing setting information of a dynamic voltage frequency scaling algorithm based on the estimated data transmission rate, and controlling an operation frequency of the central processing unit according to the dynamic voltage frequency scaling algorithm.

Example embodiments of inventive concepts provide a system-on-chip. The system-on-chip may include a network input/output device configured to receive data packets including user data, a central processing unit configured to perform a specific process on the data packets to se the user data, a performance monitoring device configured to learn a correlation between a processing performance of the central processing unit and a network throughput of the network input/output device, estimate a data transmission rate of the data packets based on a result of the learning, and dynamically change setting information of a dynamic voltage frequency scaling algorithm based on the estimated data transmission rate, and a dynamic voltage frequency scaling unit configured to receive the setting information to perform the dynamic voltage frequency scaling algorithm.

Example embodiments of inventive concepts provide a method. The method includes correlating a network throughput of a network input/output device included in a system-on-chip with a processing performance of the network input/output device, executing a clustering algorithm on the correlation and outputting a result, and adjusting a frequency of operation of the system-on-chip in response to the result.

BRIEF DESCRIPTION OF THE FIGURES

Embodiments of inventive concepts will be described below in more detail with reference to the accompanying drawings. The embodiments of inventive concepts may, however, be embodied in different forms and should not be construed as limited to the embodiments set forth herein. Rather, these embodiments are provided so that this disclosure will be thorough and complete, and will fully convey the scope of inventive concepts to those skilled in the art. Like numbers refer to like elements throughout.

DETAILED DESCRIPTION OF THE EMBODIMENTS

Below, example embodiments of inventive concepts will now be described more fully so that those skilled in the art may comprehend inventive concepts.

Figure 1:
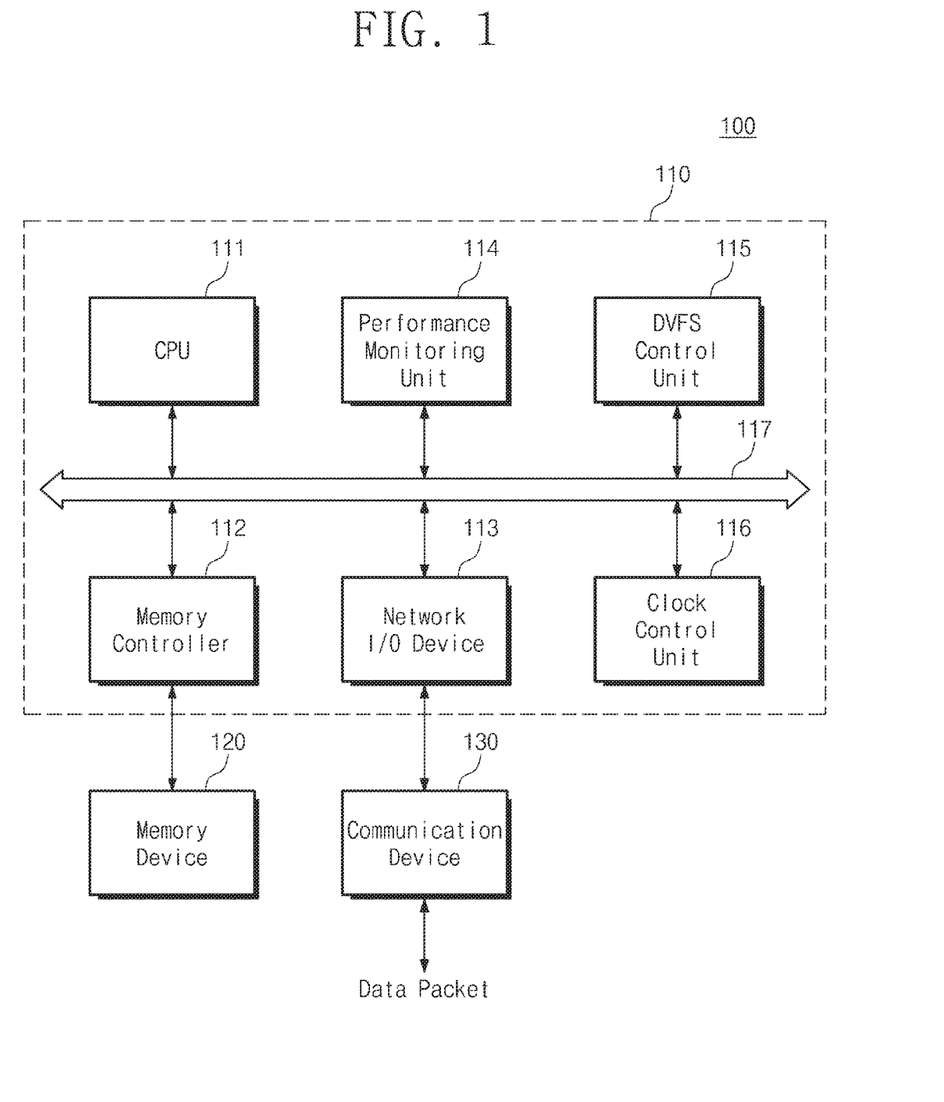
FIG. 1 is a block diagram illustrating a computing system according to example embodiments of inventive concepts.

FIG. 1 is a block diagram illustrating a computing system according to example embodiments of inventive concepts. Referring to FIG. 1, the computing system 100 may include a system-on-chip 110, a memory device 120, and a communication device 130. A configuration of the computing system 100 is not limited thereto. The computing system 100 may further include other configurations, and inventive concepts are not limited thereto.

The system-on-chip 110 may include a central processing unit (CPU) 111, a memory controller 112, a network input/output device 113, a performance monitoring unit 114, a dynamic voltage frequency scaling (DVFS) control unit 115 and a clock control unit 116. A configuration of the system-on-chip 110 is not limited thereto. The performance monitoring unit 114, the DVFS control unit 115, and other elements of the system-on-chip 110 may be or may include intellectual property blocks. The system-on-chip 110 may further include other configurations. For example, the system-on-chip 110 may further include other intellectual property blocks.

The CPU 111 may execute software (e.g., an application program, an operating system, device drivers) that will be performed in the computing system 100. For example, the CPU 111 may execute an operating system (OS) loaded into a working memory (not shown). The operating system (OS) may drive the CPU 111 to execute various application programs. The CPU 111 may be provided as or include a homogeneous multi-core processor or a heterogeneous multi-core processor. The multi-core processor may include a computing component having at least two processors (hereinafter referred to as a core) capable of being driven independently. Each core may independently read and execute program instructions.

The CPU 111 may process data packets received through the network input/output device 113. For example, the data packet may have a structure or a shape where a header is combined with user data. When receiving the data packet, the CPU 111 may perform additional operations to extract user data. When transmitting the data packet, the CPU 111 may perform additional operations to combine the header with the user data.

The memory controller 112 may control a data exchange between the system-on-chip 110 and the memory device 120. For example, the memory controller 112 may store data in the memory device 120 or read data from the memory device 120 according to a request of a host. The host may indicate intellectual property blocks included in the system-on-chip 110 such as the CPU 111. The memory controller 112 may control an overall operation of the memory device 120.

The memory device 120 may store various data. For example, the memory device 120 may store an operating system (OS), various kinds of programs, and various kinds of data. The memory device 120 may store data packets that are input or output through a network communication. The memory device 120 may be provided as or include a memory card (e.g., MMC, eMMC, SD, MicroSD, etc.). The memory device 120 may include a NAND-type flash memory having high storage capacity. The memory device 120 may include a next generation nonvolatile memory such as PRAM, MRAM, ReRAM, FRAM, etc. or a NOR-type flash memory. Additionally or alternatively, the memory device 120 may be an embedded memory included in the inside of the system-on-chip 110.

The network input/output device 113 may control a data exchange between the computing system 100 and external devices. For example, the network input/output device 113 may receive or transmit a data packet through the communication device 130. The network input/output device 113 may store the received data packet in the memory device 120. The network input/output device 113 may transmit the data packet stored in the memory device 120 to the communication device 120.

The communication device 130 may perform a data communication with external devices. For example, the communication device 130 may include a Wi-Fi module, a Bluetooth module, a communication modem, etc. The communication device 130 may be connected to a network to receive and/or transmit a data packet.

The performance monitoring unit 114 may monitor performance and a data flow of the system-on-chip 110. For example, the performance monitoring unit 114 may measure processing performance of the CPU 111 with respect to the data packet. The performance monitoring unit 114 may measure network throughput of the network input/output device 113. The performance monitoring unit 114 may be embodied in software or hardware.

The performance monitoring unit 114 may analyze a correlation (first correlation) between the measured processing performance of the CPU 111 and the measured network throughput of the network input/output device 113. For example, the performance monitoring unit 114 may analyze processing performance of the CPU 111 to determine whether the processing performance is in a normal state or in an abnormal state. The performance monitoring unit 114 may analyze network throughput of the network input/output device 113 to determine whether the network throughput is in a normal state or in an abnormal state. The normal state indicates processing performance or network throughput that meets a DVFS policy of the DVFS control unit 115. The abnormal state indicates processing performance or network throughput that does not meet the DVFS policy of the DVFS control unit 115.

The performance monitoring unit 114 may analyze a correlation (second correlation) between an abnormal state of the processing performance and an abnormal state of the network throughput based on the first correlation. For example, the performance monitoring unit 114 may cluster the first correlation of the processing performance and the first correlation of the network throughput. The performance monitoring unit 114 may extract an abnormal area, or at least one abnormal area, of a DVFS operation according to a clustering result. The abnormal area of the DVFS operation may be an area where the processing performance and the network throughput are all in an abnormal state. The performance monitoring unit 114 may estimate a data transmission rate of data packets based on the abnormal area of the DVFS operation. The data transmission rate may mean a size of data received through the network input/output device 113 per unit time. The performance monitoring unit 114 may compare the estimated data transmission rate with a current bandwidth of the network input/output device 113. The performance monitoring unit 114 may change setting information of a DVFS algorithm according to a comparison result. The performance monitoring unit 114 may provide the changed setting information of the DVFS algorithm to the DVFS control unit 115.

The DVFS control unit 115 may perform a DVFS operation of the CPU 111, the memory controller 112, and the network input/output device 113 based on the DVFS algorithm. For example, the DVFS control unit 115 may control an operation voltage and an operation frequency of the CPU 111 through a Kalman nonlinear estimation method. The DVFS control unit 115 may control an operation voltage and an operation frequency of the memory controller 112 by a minimum clock locking method; however, inventive concepts are not limited thereto. The DVFS control unit 115 may provide clock control information of the CPU 111 and the memory controller 112 to the clock control unit 116. The clock control unit 116 may change an operation voltage and an operation frequency of the CPU 111 and the memory controller 112 based on the clock control information.

The DVFS control unit 115 may change a setting value of the DVFS algorithm based on the received DVFS setting information. For example, the DVFS control unit 115 may perform a DVFS algorithm according to a new reference value based on a learning result.

A system interconnector 117 may be or may include a system bus for providing an on-chip network inside the system-on-chip 110. For example, the system interconnector 117 may include a data bus, an address bus, and a control bus. The data bus may be a path through which data moves. The data bus may be provided mainly as a memory access path to a working memory or the memory controller. The control bus may provide a path through which a control signal is transmitted between intellectual property blocks. However, a configuration of the system interconnector 117 is not limited thereto and may further include arbitration means for an efficient management.

The system-on-chip 110 may monitor network throughput of the network input/output device 113. The system-on-chip 110 may learn setting values in which a DVFS algorithm is inefficiently applied based on a monitoring result. The system-on-chip 110 may change setting information of the DVFS algorithm based on the learning result. For example, on the basis of data packets, the system-on-chip 110 may dynamically perform the DVFS algorithm and may manage the DVFS algorithm so that power and performance of the system-on-chip are maintained in an optimum, or more efficient state.

Figure 2:
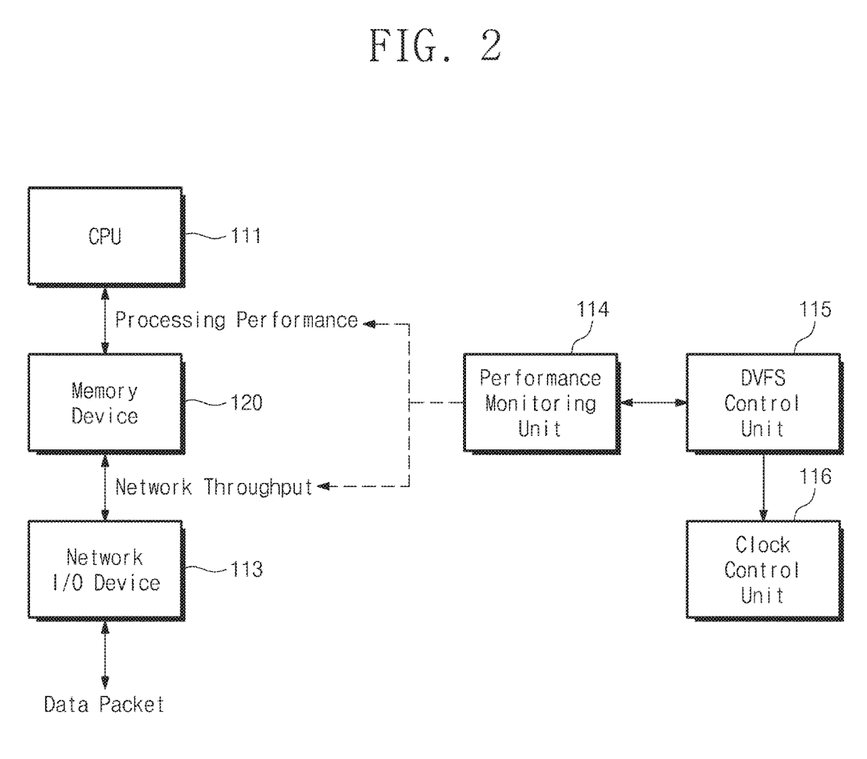
FIG. 2 is a block diagram illustrating power and performance management method of a system-on-chip according to example embodiments of inventive concepts.

FIG. 2 is a block diagram illustrating a power and performance management method of a system-on-chip according to example embodiments of inventive concepts. Referring to FIG. 2, the DVFS control unit 115 may control an operation voltage and an operation frequency of the CPU 111 and the memory device 120 according to the DVFS algorithm. The DVFS control unit 115 may generate a clock control signal and transmit the clock control signal to the clock control unit 116 according to the DVFS algorithm. The clock control unit 116 may change an operation voltage and an operation frequency of the CPU 111 and the memory device 120 based on the clock control signal.

At the beginning of an operation of the system-on-chip 110, the DVFS control unit 115 may perform a power and performance management operation according to a DVFS algorithm having initial setting values. Accordingly, the performance monitoring unit 114 may monitor network throughput of the network input/output device 113 and processing performance of the central processing unit (CPU) 111 based on a data packet received through the network input/output device 113. For example, a logical buffer may be set in the memory device 120. The network input/output device 113 may store the received data packets in the buffer of the memory device 120. The network throughput may mean the number of data packets stored in the buffer per unit time. The CPU 111 may process data packets stored in the buffer in a specific (or alternatively, predetermined) order. The processing performance may mean the number of data packets processed per unit time by the CPU 111.

The performance monitoring unit 114 may perform a first correlation analysis based on a monitoring result of the network throughput and the processing performance. For example, the performance monitoring unit 114 may classify the network throughput into a normal state and an abnormal state. The performance monitoring unit 114 may classify the processing performance into a normal state and an abnormal state. The normal state may indicate the case where when an operation frequency of the CPU 111 increases, the network throughput increases together. The abnormal state may indicate the remaining cases except the normal state.

The performance monitoring unit 114 may perform a second correlation analysis based on the first correlation analysis. For example, the performance monitoring unit 114 may cluster an abnormal state of the network throughput and an abnormal state of the processing performance to determine a correlation between the network throughput and the processing performance. The correlation between the network throughput and the processing performance may include an abnormal area where the network throughput and the processing performance are in the abnormal state. The performance monitoring unit 114 may change setting values of the DVFS algorithm so that a likelihood of being in the abnormal state is reduced. The performance monitoring unit 114 may generate DVFS setting information obtained by changing the setting values of the DVFS algorithm based on a result of the second correlation analysis. The performance monitoring unit 114 may transmit the generated DVFS setting information to the DVFS control unit 115.

The DVFS control unit 115 may perform a DVFS algorithm based on the received DVFS setting information. For example, the DVFS control unit 115 may change a reference value of the DVFS algorithm according to a monitoring result of the performance monitoring unit 114. Thus, the system-on-chip 110 may dynamically perform the DVFS algorithm based on the received data packets.

Figure 3:
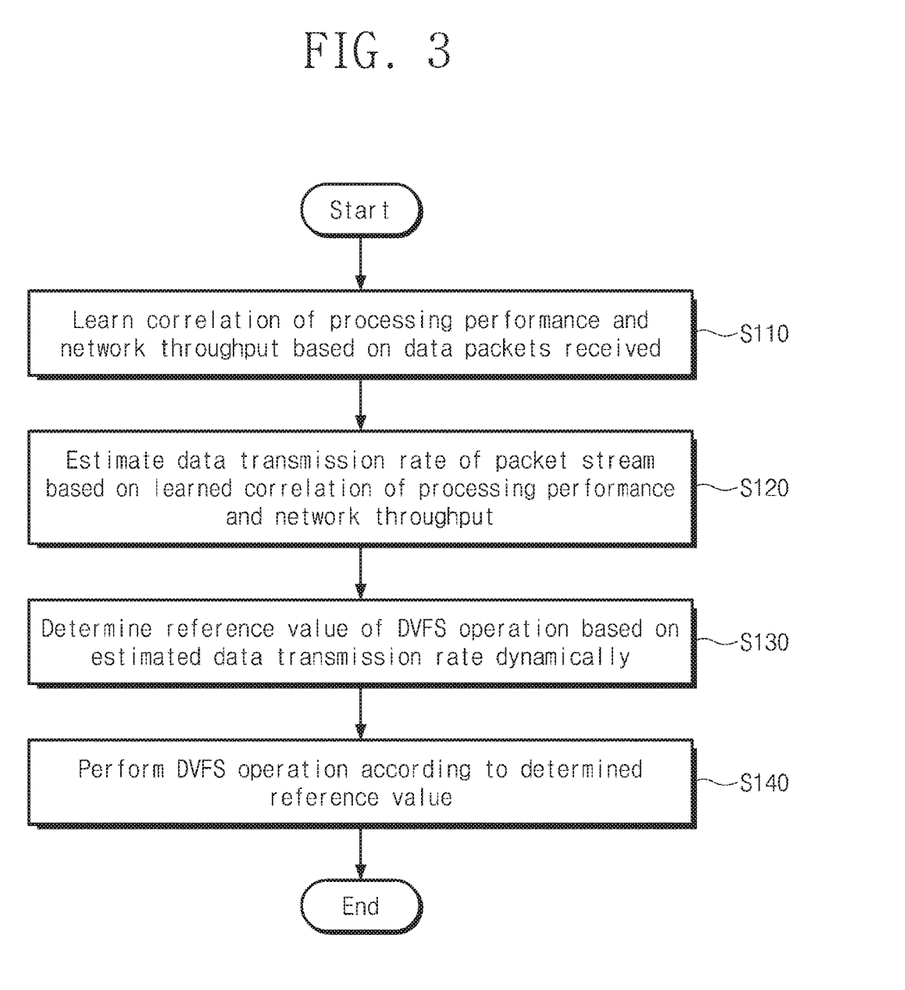
FIG. 3 is a flowchart illustrating a power and performance management method of a system-on-chip according to example embodiments of inventive concepts.

FIG. 3 is a flowchart illustrating a power and performance management method of a system-on-chip according to example embodiments of inventive concepts. Referring to FIG. 3, the system-on-chip 110 may dynamically perform power and performance management based on the data packets.

In an operation S110, the system-on-chip 110 may learn a correlation between processing performance of the CPU 111 and network throughput of the network input/output device 113 based on data packets received through the network input/output device 113. For example, the performance monitoring unit 114 may monitor data packets received through the network input/output device 113. The performance monitoring unit 114 may classify a normal state and an abnormal state of each of the processing performance and the network throughput. The abnormal state may mean the case where the network throughput does not increase in response to an increasing operation frequency of the CPU 111. The performance monitoring unit 114 may also cluster the abnormal state of the processing performance and the abnormal state of the network throughput to calculate an abnormal area of the processing performance and the network throughput.

In an operation S120, the system-on-chip 110 may estimate a data transmission rate of a packet stream based on the learned correlation between the processing performance and the learned network throughput. For example, the performance monitoring unit 114 may estimate a data transmission rate of data packets received to the network input/output device 113 based on the abnormal area of the processing performance and the network throughput. The data transmission rate may mean a size of data received to the network input/output device 113 per a unit of time. Since data packets may have various time intervals when the data packets are received and various packet sizes, the data transmission rate may change frequently. An operation frequency of the CPU 111 may need to, or be desired to, be changed according to the data transmission rate that changes frequently.

In an operation S130, the system-on-chip 110 may dynamically determine a reference value of the DVFS operation based on the estimated data transmission rate. For example, the performance monitoring unit 114 may compare the estimated data transmission rate with a current bandwidth of the network input/output device 113. In response to the estimated data transmission rate being greater than the current bandwidth as a result of comparison result, the performance monitoring unit 114 may change the setting information of the DVFS algorithm so that the processing performance of the CPU 111 increases. In response to the estimated data transmission rate being less than or equal to the current bandwidth as a result of comparison result, the performance monitoring unit 114 may change the setting information of the DVFS algorithm so that the processing performance of the CPU 111 decreases.

In an operation S140, the system-on-chip 110 may perform the DVFS operation according to the reference value determined in the operation S130. For example, the DVFS control unit 115 may receive the changed setting information of the DVFS algorithm. The DVFS control unit 115 may perform the DVFS algorithm according to the changed setting information.

The system-on-chip 110 may monitor the processing performance of the CPU 111 and the network throughput of the network input/output device 113. The system-on-chip 110 may learn setting values in which the DVFS algorithm is inefficiently applied based on the result of the monitoring. The system-on-chip 110 may change the setting information of the DVFS algorithm based on the result of the learning. For example, the system-on-chip 110 may dynamically perform the DVFS algorithm based on data packets.

Figure 4:
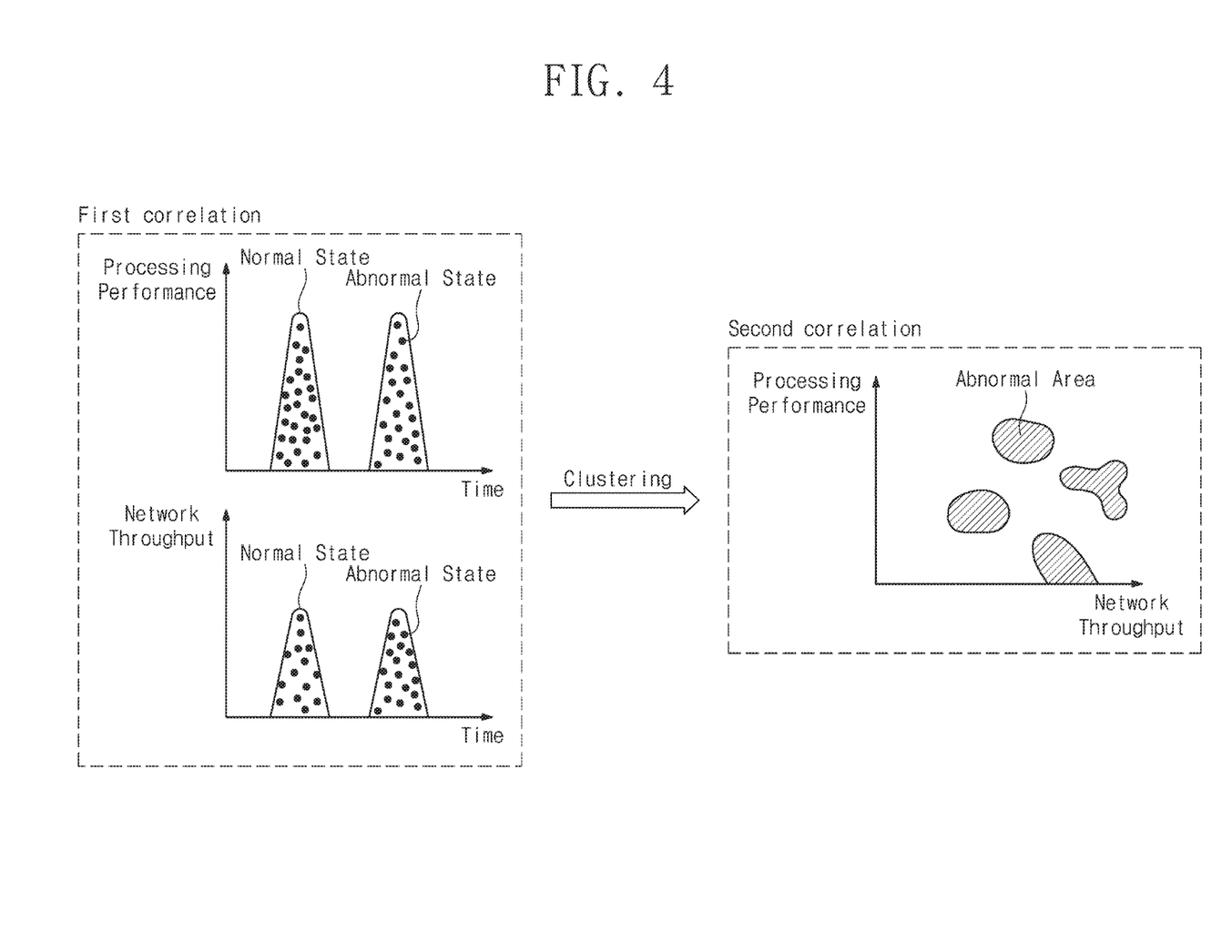
FIG. 4 is a view illustrating first and second correlation analyses according to example embodiments of inventive concepts.

FIG. 4 is a view illustrating first and second correlation analyses according to example embodiments of inventive concepts. Referring to FIG. 4, the performance monitoring unit 114 may monitor processing performance of the CPU 111 over time. For example, in a graph of processing performance, a normal state may be distributed below a solid line. The abnormal state is a part indicated by a point. The performance monitoring unit 114 may classify the normal state and the abnormal state in a processing performance monitoring result such as the graph of processing performance through the first correlation analysis.

The performance monitoring unit 114 may monitor network throughput of the network input/output device 113 over time. For example, in a graph of network throughput, a normal state may be distributed below a solid line. The abnormal state is a part indicated by a point. The performance monitoring unit 114 may classify the normal state and the abnormal state in a network throughput monitoring result such as the graph of network throughput through the first correlation analysis.

The performance monitoring unit 114 may perform a second correlation analysis based on a first correlation analysis result. For example, the performance monitoring unit 114 may cluster a first correlation analysis result of the processing performance and a first correlation analysis result of the network throughput to calculate a correlation between the processing performance and the network throughput. An abnormal area exists in a second correlation analysis graph. The abnormal area shows setting values in which the DVFS algorithm is inefficiently performed. For example, the abnormal area means a state where an operation frequency of the CPU 111 needs to, or is desired to, be changed. Thus, the performance monitoring unit 114 may change setting values of the DVFS algorithm so that a likelihood of being in the abnormal area is reduced based on the second correlation analysis result. The clustering algorithm may include an algorithm such as a K-means clustering, a hierarchical clustering, and/or a mean-shift clustering, however, inventive concepts are not limited thereto.

Figure 5:
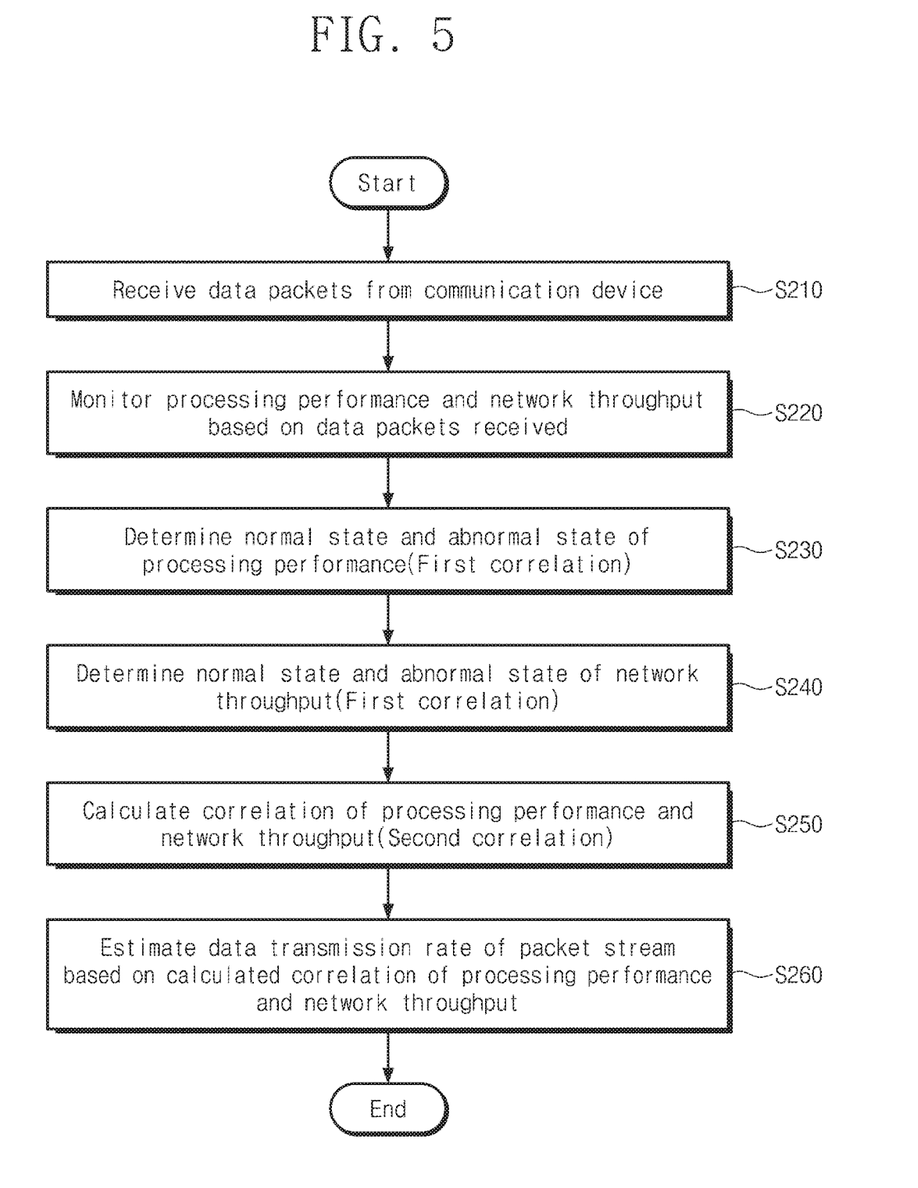
FIG. 5 is a flowchart illustrating an estimation method of a data transmission rate according to example embodiments of inventive concepts.

FIG. 5 is a flowchart illustrating an estimation method of a data transmission rate according to example embodiments of inventive concepts. Referring to FIG. 5, the system-on-chip 110 may estimate a data transmission rate of a packet stream through the first and second correlation analyses.

In an operation S210, the system-on-chip 110 may receive data packets from the communication device 130. For example, the communication device 130 may be connected to a network by wired or wireless to receive data packets. The network input/output device 113 may receive data packets from the communication device 130, and may store them in a logical buffer. The logical buffer may be included in the memory device 120 and a size of the logical buffer may be adjusted according to a reception state of the data packets.

In an operation S220, the system-on-chip 110 may monitor processing performance of the CPU 111 and network throughput of the network input/output device 113 based on the received data packets. For example, the network throughput may be defined by the number of data packets stored in the buffer per unit time by the network input/output device 113. The CPU 111 may process the data packets stored in the buffer in a desired (or alternatively, predetermined) order. The processing performance may be defined by the number of data packets processed per unit time by the CPU 111.

In an operation S230, the system-on-chip 110 may determine whether the processing performance is in the normal state or in the abnormal state by the first correlation analysis. In an operation S240, the system-on-chip 110 may determine whether the network throughput is in the normal state or in the abnormal state by the first correlation analysis. For example, the normal state may indicate the case where when an operation frequency of the CPU 111 increases, the data transmission rate increases together. The abnormal state may indicate the remaining cases except the normal state.

In an operation S250, the system-on-chip 110 may calculate a correlation between the processing performance and the network throughput by the second correlation analysis. For example, the performance monitoring unit 114 may cluster the abnormal state of the processing performance and the abnormal state of the network throughput to calculate an abnormal area, or at least one of a plurality of abnormal areas, of the processing performance and the network throughput. The abnormal area may indicate setting values in which the DVFS algorithm is inefficiently performed. For example, the abnormal area may be a state where an operation frequency of the CPU 111 needs, or is desired, to be changed.

In an operation S260, the system-on-chip 110 may estimate a data transmission rate of a packet stream based on the calculated correlation between the processing performance and the learned network throughput. For example, the performance monitoring unit 114 may estimate a data transmission rate of data packets received to the network input/output device 113 based on the likelihood, as measured by a size of an abnormal area of the processing performance and the network throughput being abnormal. The data transmission rate may mean a size of data received to the network input/output device 113 per unit time. Since data packets have various time intervals when the data packets are received and various packet sizes, the data transmission rate may change frequently. An operation frequency of the CPU 111 may need to be changed according to the data transmission rate that changes frequently.

The system-on-chip 110 may monitor the processing performance of the CPU 111 and the network throughput of the network input/output device 113. The system-on-chip 110 may learn setting values in which a DVFS algorithm is inefficiently applied based on a monitoring result. The system-on-chip 110 may change setting information of the DVFS algorithm based on the learning result. For example, the system-on-chip 110 may dynamically perform the DVFS algorithm based on the data packets.

Figure 6:
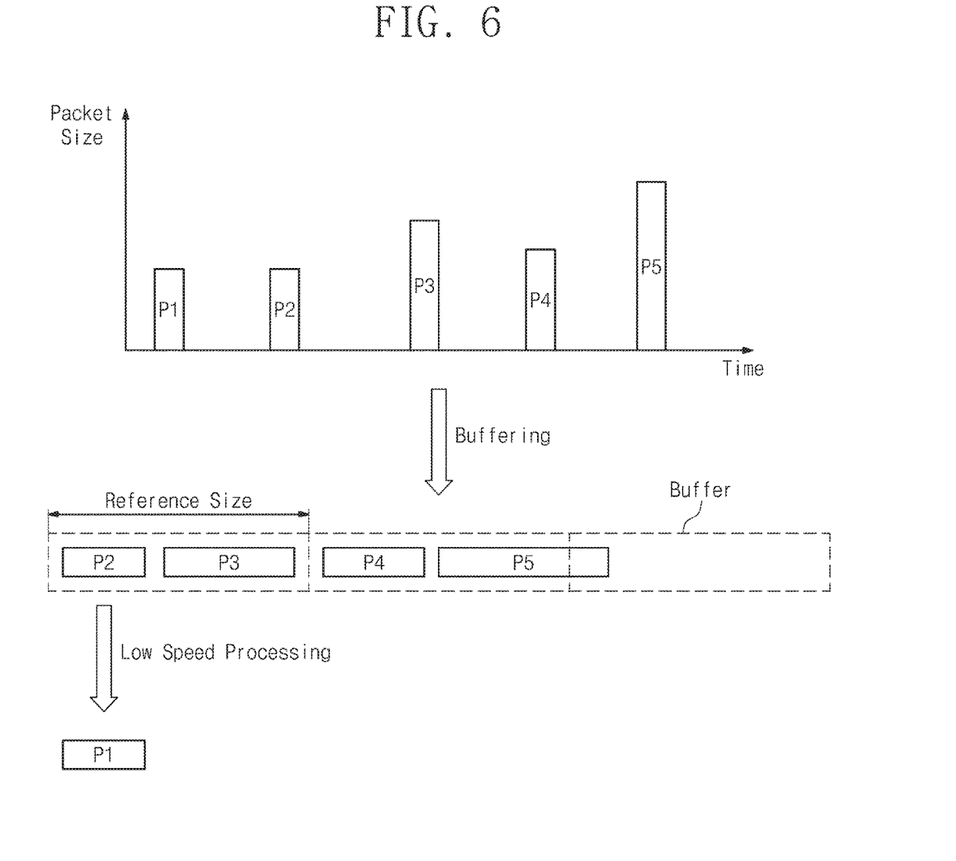
FIGS. 6 and 7 are views illustrating a DVFS control method according to example embodiments of inventive concepts.
Figure 7:
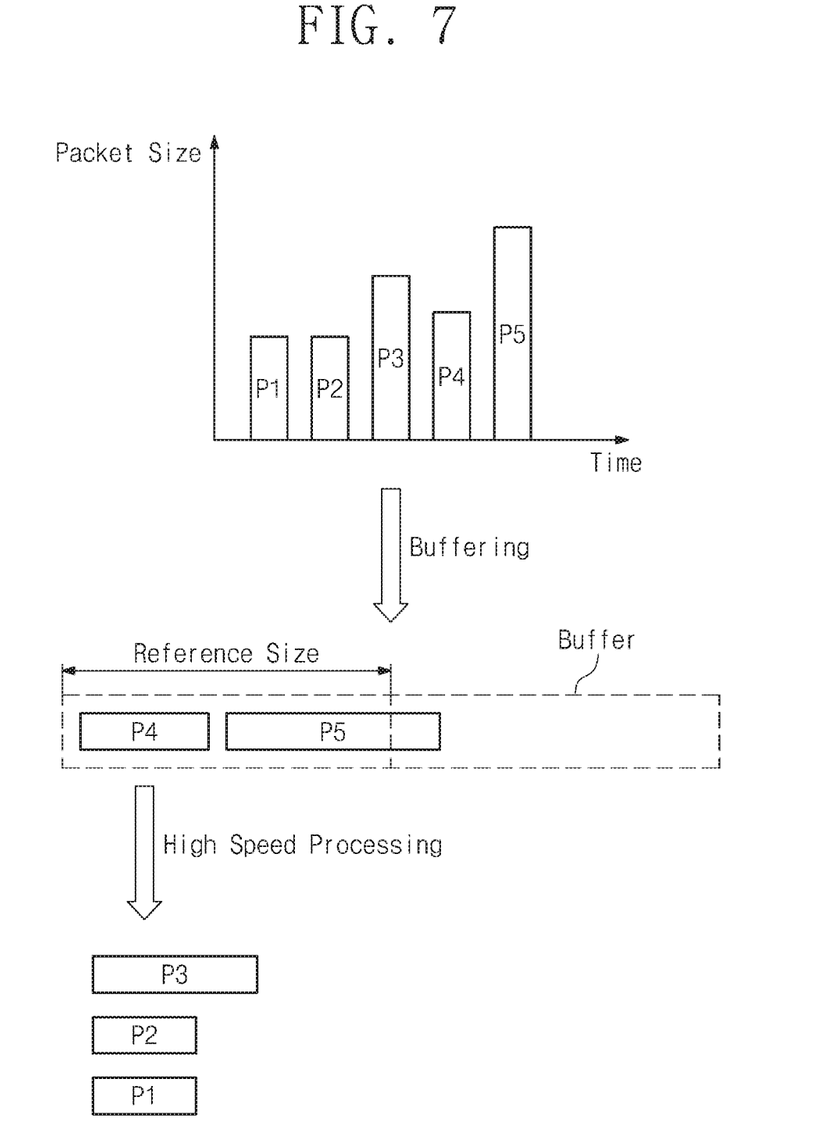

FIGS. 6 and 7 are views illustrating a DVFS control method according to example embodiments of inventive concepts. Referring to FIGS. 6 and 7, the network input/output device 113 may receive data packets (P1 to P5). For example, the data packets (P1 to P5) may have various sizes. The data packets (P1 to P5) may be received at various time intervals. The received data packets (P1 to P5) may be buffered in the memory device 120. For example, the logical buffer may be set in the memory device 120. A size of the buffer may increase or decrease depending on the number of the data packets received. A size of the buffer may increase or decrease on a per-reference size basis. The data packets (P1 to P5) stored in the buffer may be processed by the CPU 111 in a specific (or alternatively, predetermined) order.

In FIG. 6, the data packets (P1 to P5) are received at long time intervals. In the case where the data packets (P1 to P5) are received at long time intervals, a data transmission rate is lowered. If the data transmission rate is lowered, the performance monitoring unit 114 may generate DVFS setting information so that processing performance of the CPU 111 is reduced. Thus, the performance monitoring unit 114 may generate a clock control signal according to the DVFS setting information. The clock control unit 116 may reduce an operation frequency of the CPU 111 according to the clock control signal.

In FIG. 7, the data packets (P1 to P5) are received at short time intervals. In the case where the data packets (P1 to P5) are received at short time intervals, a data transmission rate increases. If the data transmission rate increases, the performance monitoring unit 114 may generate DVFS setting information so that processing performance of the CPU 111 increases. Thus, the performance monitoring unit 114 may generate a clock control signal according to the DVFS setting information. The clock control unit 116 may increase an operation frequency of the CPU 111 according to the clock control signal.

Figure 8:
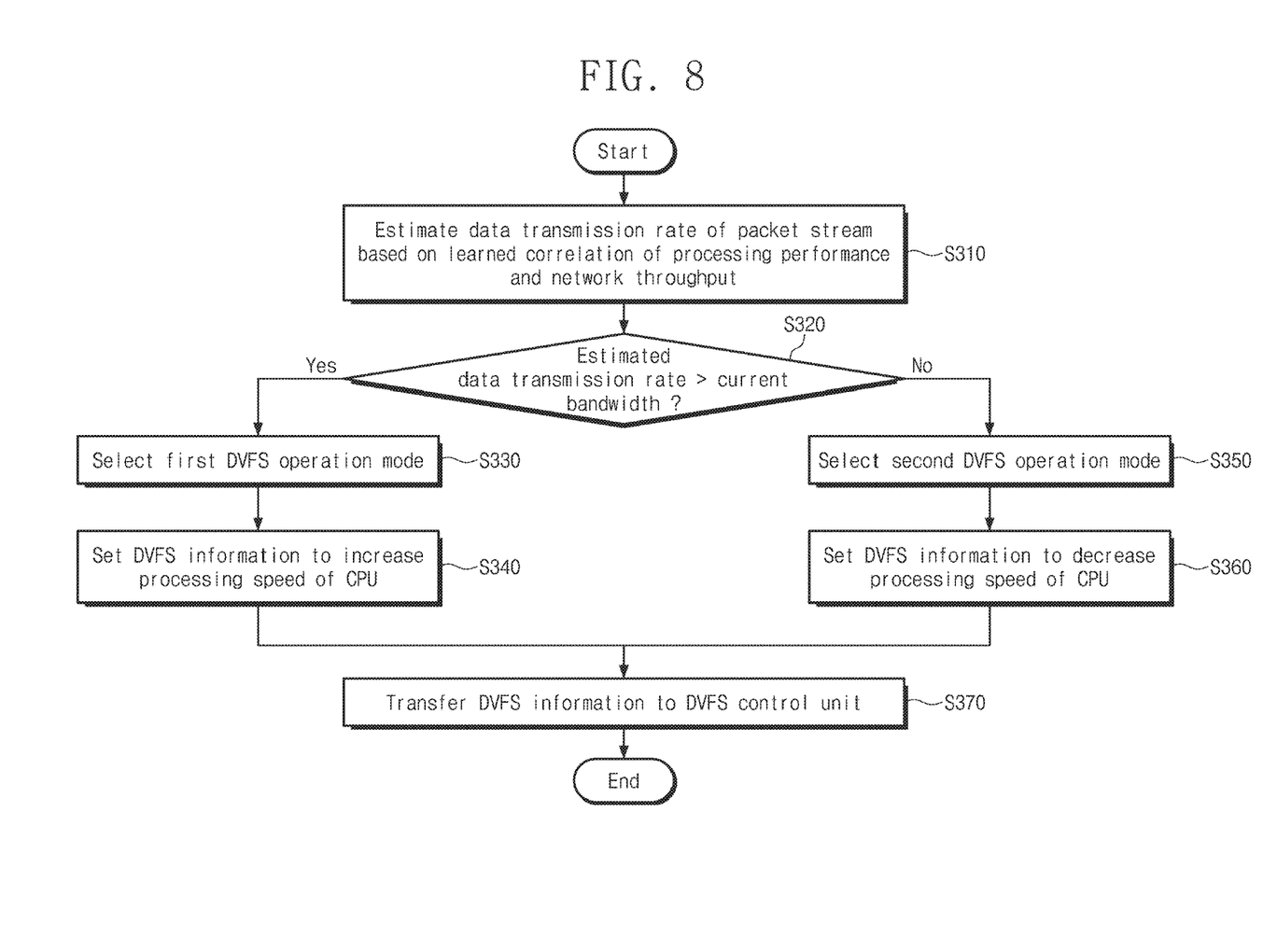
FIG. 8 is a flowchart illustrating a method of determining a DVFS operation mode according to example embodiments of inventive concepts.

FIG. 8 is a flowchart illustrating a method of determining a DVFS operation mode according to example embodiments of inventive concepts. Referring to FIG. 8, the performance monitoring unit 114 may compare an estimated data transmission rate with a current bandwidth to determine a DVFS operation mode.

In an operation S310, the performance monitoring unit 114 may estimate a data transmission rate of a packet stream based on a correlation between processing performance of the CPU 111 and network throughput of the network input/output device 113. For example, the performance monitoring unit 114 may estimate a data transmission rate through the operation S210 through S260 of FIG. 5.

In an operation S320, the performance monitoring unit 114 may compare the estimated data transmission rate with a current bandwidth of the network input/output device 113. In the case where the estimated data transmission rate is greater than the current bandwidth as a result of comparison, the procedure goes to an operation S330. In the case where the estimated data transmission rate is less than or equal to the current bandwidth as a result of comparison, the procedure goes to an operation S350.

In the operation S330, in the case where the estimated data transmission rate is greater than the current bandwidth, the performance monitoring unit 114 may select a first DVFS operation mode. For example, the case where the estimated data transmission rate is greater than the current bandwidth is the case described in FIG. 7. Since input time intervals of data packets are expected to become shortened or a size of the data packets is expected to become great, the processing performance of the CPU 111 is desired to be increased. In an operation S340, the performance monitoring unit 114 may generate DVFS setting information so that a processing speed of the CPU 111 increases.

In the operation S350, in the case where the estimated data transmission rate is less than or equal to the current bandwidth, the performance monitoring unit 114 may select a second DVFS operation mode. For example, the case where the estimated data transmission rate is less than or equal to the current bandwidth is the case described in FIG. 6. Since input time intervals of data packets are expected to become longer or a size of the data packets is expected to become small, the processing performance of the CPU 111 is desired to be decreased. In an operation S360, the performance monitoring unit 114 may generate DVFS setting information so that a processing speed of the CPU 111 decreases.

In an operation S370, the performance monitoring unit 114 may transmit the DVFS setting information to the DVFS control unit 115. The DVFS control unit 115 may receive changed setting information of a DVFS algorithm. The DVFS control unit 115 may perform the DVFS algorithm according to the changed setting information. Thus, the DVFS algorithm may be dynamically performed based on the estimated data transmission rate of the data packets.

In FIG. 8, the performance monitoring unit 114 selects the first and second DVFS operation modes based on the estimated data transmission rate. However, the DVFS operation mode is not limited thereto. The performance monitoring unit 114 may set various DVFS operation modes based on the estimated data transmission rate. The performance monitoring unit 114 may variously change setting information of the DVFS algorithm based on the various DVFS operation modes.

Figure 9:
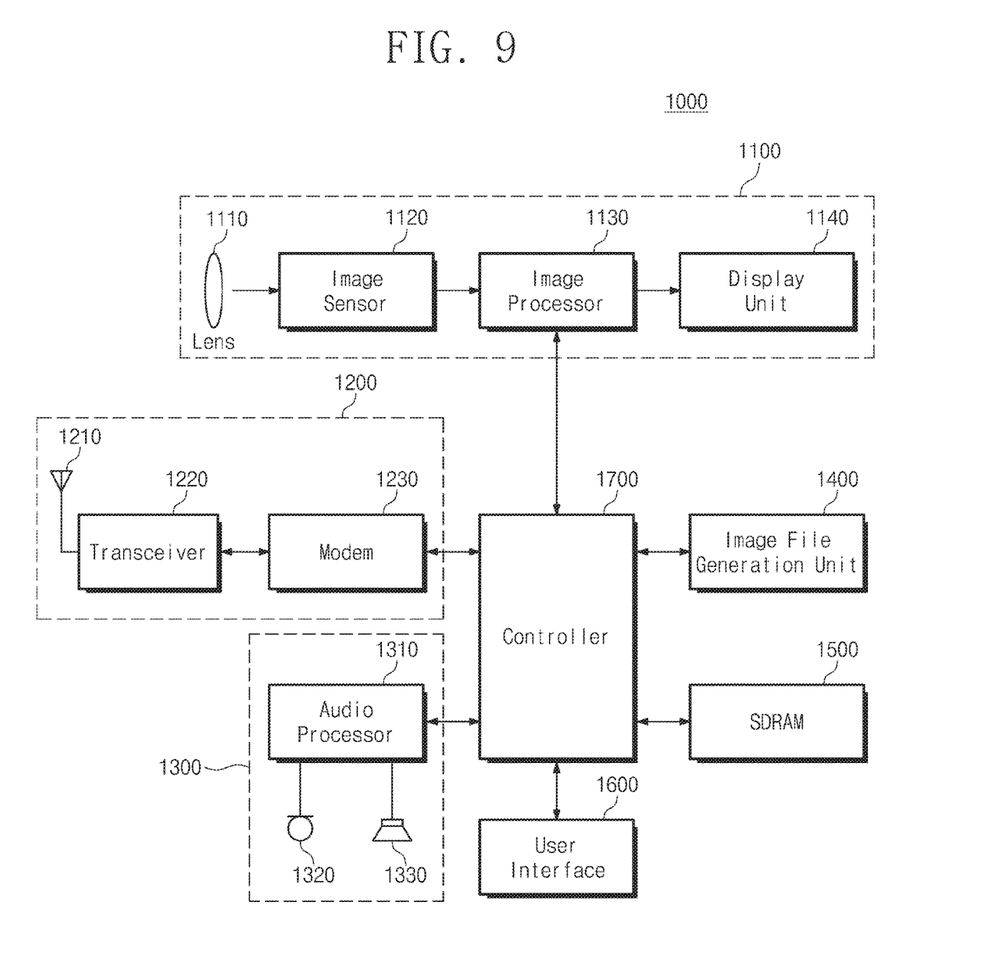
FIG. 9 is a block diagram illustrating a mobile device including a system-on-chip according to example embodiments of inventive concepts.

FIG. 9 is a block diagram illustrating a mobile device including a system-on-chip according to example embodiments of inventive concepts. Referring to FIG. 9, a mobile device 1000 may include an image processing unit 1100, a wireless transmission/reception unit 1200, an audio processing unit 1300, an image file generating unit 1400, a SRAM 1500, a user interface 1600, and a controller 1700.

The image processing unit 1100 may include a lens 1110, an image sensor 1120, an image processor 1130, and a display unit 1140. The wireless transmission/reception unit 1200 may include an antenna 1210, a transceiver 1220, and a modem 1230. The audio processing unit 1300 may include an audio processor 1310, a mike 1320, and a speaker 1330.

Various types of semiconductor devices may be included in the mobile device 1000. Low power and high performance are desired for a system-on-chip performing a function of the controller 1700. The controller 1700 may monitor network throughput and processing performance of packet data received through the wireless transmission/reception unit 1200. The controller 1700 may dynamically change setting values of the DVFS algorithm based on a monitoring result. Thus, the controller 1700 may maintain power and performance of the mobile device 1000 in an efficient state.

Figure 10:
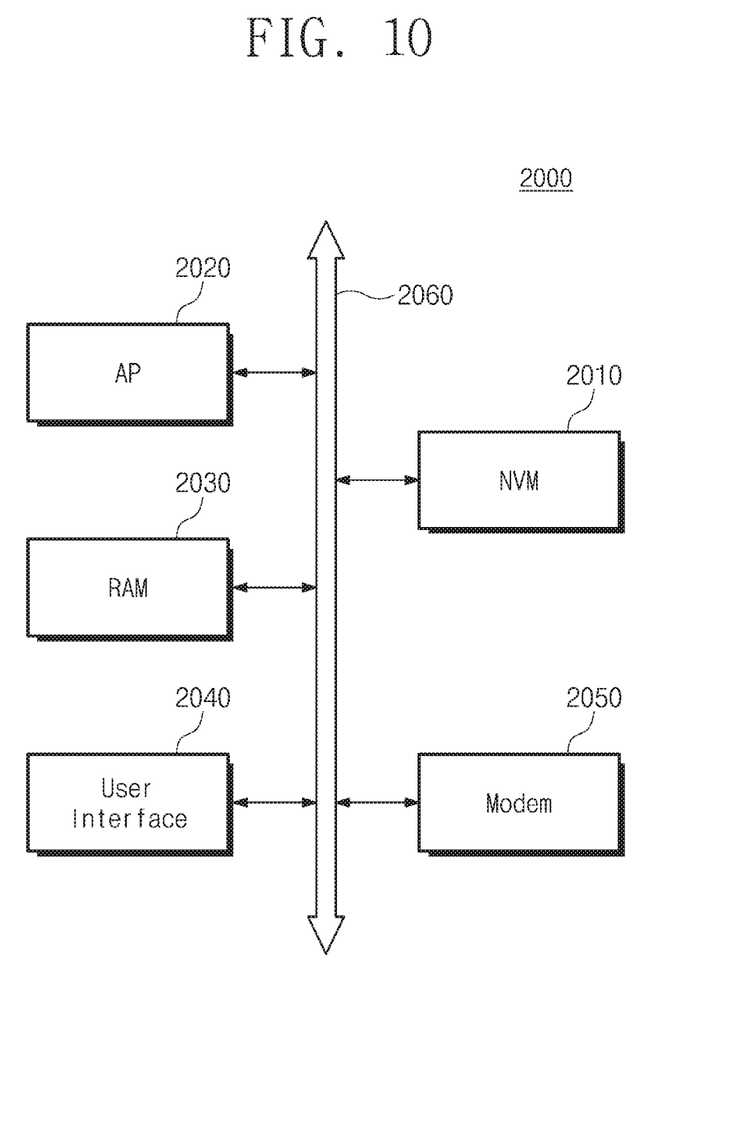
FIG. 10 is a block diagram illustrating a computing device including a system-on-chip according to example embodiments of inventive concepts.

FIG. 10 is a block diagram illustrating a computing device including a system-on-chip according to example embodiments of inventive concepts. Referring to FIG. 10, the computing device 2000 may include a nonvolatile memory device 2010, an application processor (AP) 2020, a RAM 2030, a user interface 2040 and a modem 2050 like a baseband chipset that are electrically connected to a system bus 2060.

In the case where the computing device 2000 is a mobile device, a battery (not shown) for supplying an operation voltage of the computing device 2000 may be additionally provided. Although not illustrated in the drawing, an application chipset, a camera image processor (CIS), a mobile DRAM, and/or other items, may be further provided to the computing device 2000.

The application processor 2020 may perform a function which is the same as or similar to the system-on-chip described in FIGS. 1 through 8. The application processor 2020 may monitor net network throughput and processing performance of packet data received through the modem 2050. The application processor 2020 may dynamically change setting values of a DVFS algorithm based on a monitoring result. Thus, the application processor 2020 can maintain power and performance of the computing device 2000 in an efficient state.

The memory system or the storage device may be mounted using various types of packages such as package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi-chip package (MCP), wafer-level fabricated package (WFP) and wafer-level processed stack package (WSP).

According to example embodiments of inventive concepts, a dynamic voltage frequency scaling algorithm may be dynamically applied considering a data transmission rate of data packets being received.

The contents described above are specific embodiments for implementing inventive concepts. Inventive concepts may include not only the embodiments described above but also embodiments in which a design is simply or easily capable of being changed. Inventive concepts may also include technologies easily changed to be implemented using embodiments.

What is claimed is:

1. A method of operating a system-on-chip comprising:
   learning a correlation between network throughput of a network input/output device receiving data packets and processing performance of a central processing unit processing the data packets;
   estimating a data transmission rate of the data packets based on a result of learning the correlation;
   dynamically changing setting information of a dynamic voltage frequency scaling algorithm based on the estimated data transmission rate; and
   controlling an operation frequency of the central processing unit according to the dynamic voltage frequency scaling algorithm,
   wherein the learning includes,
      monitoring the processing performance and the network throughput,
      determining a first abnormal state of the processing performance,
      determining a second abnormal state of the network throughput, and
      clustering the first and second abnormal states to calculate at least one abnormal area of the processing performance and the network throughput, and
   wherein in the first and second abnormal states, the network throughput decreases in response to the operation frequency of the central processing unit increasing.

2. The method of operating a system-on-chip of claim 1, wherein the estimating the data transmission rate includes estimating the data transmission rate based on the at least one abnormal area.

3. The method of operating a system-on-chip of claim 1, wherein the dynamically changing setting information of a dynamic voltage frequency scaling algorithm comprises:
   comparing the estimated data transmission rate with a current bandwidth of the network input/output device; and
   determining an operation mode of the dynamic voltage frequency scaling algorithm according to the result of the comparing.

4. The method of operating a system-on-chip of claim 3, wherein
   the setting information of the dynamic voltage frequency scaling algorithm is changed such that the processing performance of the central processing unit increases in response to the estimated data transmission rate being greater than the current bandwidth.

5. The method of operating a system-on-chip of claim 3, wherein,
   the setting information of the dynamic voltage frequency scaling algorithm is changed such that the processing performance of the central processing unit decreases in response to the estimated data transmission rate being less than or equal to the current bandwidth.

6. The method of operating a system-on-chip of claim 1, wherein the processing performance of the central processing unit is defined by a number of the data packets processed per a unit of time.

7. The method of operating a system-on-chip of claim 1, wherein the network throughput of the network input/output device is defined by a number of data packets stored in a buffer per a unit of time.

8. The method of operating a system-on-chip of claim 1, wherein the data transmission rate is defined by a size of data received by the network input/output device per a unit of time.

9. A system-on-chip comprising:
   a network input/output device configured to receive data packets including user data;
   a central processing unit configured to perform a specific process on the data packets to use the user data;
   a performance monitoring device configured to learn a correlation between a processing performance of the central processing unit and a network throughput of the network input/output device, estimate a data transmission rate of the data packets based on a result of the learning, and dynamically change setting information of a dynamic voltage frequency scaling algorithm based on the estimated data transmission rate; and
   a dynamic voltage frequency scaling unit configured to receive the setting information to perform the dynamic voltage frequency scaling algorithm, wherein the performance monitoring device is configured to monitor the processing performance and the network throughput and is configured to determine whether the processing performance is in a first abnormal state and whether the network throughput is in a second abnormal state based on a result of the monitoring, wherein in the first and second abnormal states, when an operation frequency of the central processing unit increases, the network throughput decreases, wherein the performance monitoring device is configured to cluster the first and second abnormal states to calculate at least one abnormal area of the processing performance and the network throughput.

10. The system-on-chip of claim 9, wherein the performance monitoring device is configured to estimate the data transmission rate based on the at least one abnormal area.

11. The system-on-chip of claim 10, wherein the performance monitoring device is configured to change the setting information of the dynamic voltage frequency scaling algorithm such that the operation frequency of the central processing unit increases in response to the estimated data transmission rate being greater than a current bandwidth of the network input/output device, and the performance monitoring device is configured to change the setting information of the dynamic voltage frequency scaling algorithm such that the operation frequency of the central processing unit decreases in response to the estimated data transmission rate being less than or equal to the current bandwidth of the network input/output device.

* * * * *